United States Patent
Chen et al.

(10) Patent No.: US 10,209,545 B2
(45) Date of Patent: Feb. 19, 2019

(54) LIQUID CRYSTAL DISPLAY DEVICE WITH MOLD FRAME HAVING ACCOMMODATION HOLES FOR HOUSING HEIGHT-CONSTRAINT ELECTRONIC COMPONENTS

(71) Applicant: Wuhan China Star Optoelectronics Technology Co., Ltd., Wuhan (CN)

(72) Inventors: Shihhsiang Chen, Wuhan (CN); Chao Liang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 215 days.

(21) Appl. No.: 15/106,314

(22) PCT Filed: May 23, 2016

(86) PCT No.: PCT/CN2016/083067
§ 371 (c)(1),
(2) Date: Jun. 19, 2016

(87) PCT Pub. No.: WO2017/190379
PCT Pub. Date: Nov. 9, 2017

(65) Prior Publication Data
US 2018/0101043 A1   Apr. 12, 2018

(30) Foreign Application Priority Data

May 5, 2016   (CN) .......................... 2016 1 0292341

(51) Int. Cl.
*G02F 1/1333* (2006.01)
*G02F 1/1345* (2006.01)
(Continued)

(52) U.S. Cl.
CPC ...... *G02F 1/133305* (2013.01); *G02F 1/1336* (2013.01); *G02F 1/13452* (2013.01);
(Continued)

(58) Field of Classification Search
CPC ........... G02F 1/13452; G02F 1/133305; G02F 1/133615; G02F 1/133603;
(Continued)

(56) References Cited

U.S. PATENT DOCUMENTS

| | | | | |
|---|---|---|---|---|
| 5,432,626 A * | 7/1995 | Sasuga | ............... | G02F 1/133308 349/58 |
| 2006/0097364 A1* | 5/2006 | Shinojima | ........... | G02F 1/13452 257/666 |
| 2006/0098392 A1* | 5/2006 | Sakurai | ............... | G02F 1/13452 361/520 |
| 2008/0303972 A1* | 12/2008 | Han | .................... | G02F 1/13452 349/58 |

(Continued)

FOREIGN PATENT DOCUMENTS

CN   101320142 A   12/2008

*Primary Examiner* — Anh T Mai
*Assistant Examiner* — Steven Y Horikoshi
(74) *Attorney, Agent, or Firm* — Leong C. Lei

(57) ABSTRACT

The present invention provides a liquid crystal display device, which includes a liquid crystal display panel (2) and a backlight module (1) arranged on an undersurface of the liquid crystal display panel (2). A first flexible circuit board (20) and a second flexible circuit board (15) are electrically connected together and height-constraint components (22) of a liquid crystal display panel drive circuit and a backlight source drive circuit are collectively arranged on the second flexible circuit board (15). A mold frame (11) of the backlight module (2) is provided with accommodation holes (111) formed therein to receive and accommodates the height-constraint components (22) so as to effectively reduce the thickness of the liquid crystal display device and improve product competition power.

12 Claims, 3 Drawing Sheets

(51) Int. Cl.
*G02F 1/1335* (2006.01)
*G02F 1/13357* (2006.01)

(52) U.S. Cl.
CPC .. *G02F 1/133308* (2013.01); *G02F 1/133603* (2013.01); *G02F 1/133605* (2013.01); *G02F 1/133606* (2013.01); *G02F 1/133608* (2013.01); *G02F 1/133615* (2013.01); *G02F 2001/133314* (2013.01); *G02F 2001/133317* (2013.01); *G02F 2001/133612* (2013.01)

(58) Field of Classification Search
CPC ... G02F 1/133608; G02F 2001/133612; G02B 6/0083; G02B 6/0035
See application file for complete search history.

(56) References Cited

U.S. PATENT DOCUMENTS

| | | | |
|---|---|---|---|
| 2009/0237583 A1* | 9/2009 | Chol | G02F 1/133308 349/58 |
| 2010/0246209 A1* | 9/2010 | Park | G02B 6/0083 362/606 |
| 2011/0102726 A1* | 5/2011 | Nobeoka | G02F 1/13306 349/150 |
| 2011/0149195 A1* | 6/2011 | Kobayashi | G02F 1/133308 349/58 |
| 2014/0362327 A1* | 12/2014 | Ohkubo | G02F 1/133308 349/58 |
| 2016/0018691 A1* | 1/2016 | Ohashi | G02F 1/133308 348/790 |

* cited by examiner

LIQUID CRYSTAL DISPLAY DEVICE WITH MOLD FRAME HAVING ACCOMMODATION HOLES FOR HOUSING HEIGHT-CONSTRAINT ELECTRONIC COMPONENTS

BACKGROUND OF THE INVENTION

1. Field of the Invention

The present invention relates to the field of liquid crystal display technology, and in particular to a liquid crystal display device.

2. The Related Arts

Liquid crystal displays (LCDs) have a variety of advantages, such as thin device body, low power consumption, and being free of radiation, and thus have wide applications, such as liquid crystal televisions, mobile phones, personal digital assistants (PDAs), digital cameras, computer monitors, and notebook computer screens, making them take a leading position in the field of flat panel displays.

Most of the LCDs that are currently available in the market are backlighting LCDs, which comprise a liquid crystal display panel and a backlight module. The working principle of the liquid crystal display panel is that a drive voltage is applied to a thin-film transistor (TFT) array substrate and a color filter (CF) substrate to control a rotation direction of the liquid crystal molecules located between the two substrates in order to refract out light emitting from the backlight module to generate an image.

Since the liquid crystal display panel itself does not emit light, light must be provided from the backlight module in order to normally display images. Thus, the backlight module is one of the key components of the liquid crystal display devices. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, which is arranged rearward of one side of the liquid crystal panel to serve as a backlighting source.

In the state-of-the-art designs of small- and medium-size liquid crystal display devices, the backlight module and the liquid crystal display panel are separate structures and the drive circuits thereof are also independent of each other so that components of the separate drive circuits are generally independent. Also, assembly of the liquid crystal display devices is conducted in a manner of separate assembling. For example, after the assembly of the backlight module has been completely, combination of the liquid crystal display panel with the drive circuit thereof is then conducted separately.

Referring to FIG. 1, a conventional liquid crystal display device comprises: a liquid crystal display panel 2' and a backlight module 1' arranged on an undersurface of the liquid crystal display panel 2'. The liquid crystal display panel 2' is provided, at one side thereof, with a first flexible circuit board 20' that is electrically connected to the liquid crystal display panel 2'. The backlight module 1' comprises: a mold frame 11', a reflector plate 12' arranged on an undersurface of the mold frame 11', a light guide plate 13' arranged on a top surface of the reflector plate 12' and located inwardly of the mold frame 11', a backlight source 14' arranged between the light guide plate 13' and the mold frame 11', a second flexible circuit board 15' arranged on a top surface of the backlight source 14' and electrically connected to the backlight source 14', and a diffuser plate and the optical film 16' arranged on a top surface of the light guide plate 13'. The second flexible circuit board 15' serves as a backlight source circuit board and has a surface on which a backlight source circuit is formed for activating the backlight source 14' to give off light. The first flexible circuit board 20' serves as a liquid crystal display panel drive circuit, which comprises a drive circuit 30' that includes height-constraint components 31' (such as capacitors and resistors) for driving the liquid crystal display panel 2'. In the liquid crystal display device, the first flexible circuit board 20' extends from the top surface of the backlight module 1' and along a lateral side surface of the backlight module 1' to be folded backward to an under surface of the backlight module 1' such that a portion of the drive circuit 30' that includes the height-constraint components 31' is folded to the undersurface of the backlight module 1', whereby the locations of the height-constraint components 31' are the highest locations of the undersurface of the backlight module 1', which affects the thickness of the liquid crystal display device and may easily cause internal interference in the liquid crystal display device. Two prior art solutions are commonly adopted to handle such a problem. One is to adjust the heights of driving components/devices 31' of the drive circuit 30'; this, however, increases product cost and affects reliability of driving. The second is to improve a stacking structure of the liquid crystal display device through operations of forming holes or reducing thickness applied on mechanical parts (such as a front bezel and an intermediate frame); this, however, affects specification relating to overall thickness of the entire device and increase product cost.

SUMMARY OF THE INVENTION

An object of the present invention is to provide a liquid crystal display device, which has a reduced overall thickness of the device and provides high product competition power.

To achieve the above objects, the present invention provides a liquid crystal display device, which comprises: a liquid crystal display panel and a backlight module arranged on an undersurface of the liquid crystal display panel;

the liquid crystal display panel comprising a liquid crystal display panel body and a first flexible circuit board that is arranged at one side of the liquid crystal display panel body and is electrically connected with the liquid crystal display panel body;

the backlight module comprising a mold frame, a backlight source arranged in the mold frame, and a second flexible circuit board that is arranged on a top surface of the backlight source and a surface of the mold frame and is electrically connected to both the backlight source and the first flexible circuit board;

the second flexible circuit board comprising a backlight source drive circuit formed thereon;

the first flexible circuit board and the second flexible circuit board collectively comprising a liquid crystal display panel drive circuit formed thereon, the liquid crystal display panel drive circuit comprising a plurality of height-constraint components;

the plurality of height-constraint components being arranged on a surface of the second flexible circuit board that is adjacent to the mold frame, the mold frame comprising accommodation holes formed therein at locations corresponding to the height-constraint components arranged on the second flexible circuit board in order to receive and accommodate the height-constraint components therein.

The first flexible circuit board and the second flexible circuit board are two separate flexible circuit boards and the first flexible circuit board and the second flexible circuit board are electrically connected to each other through a connector.

The first flexible circuit board and the second flexible circuit board are two separate portions of a unitary flexible circuit board.

The first flexible circuit board extends from a top surface of the backlight module through a lateral side surface of the backlight module and is backward folded to be positioned on an undersurface of the backlight module.

The backlight module further comprises a reflector plate arranged on an undersurface of the mold frame, a light guide plate arranged on a top surface of the reflector plate, and am optical film assembly arranged on a top surface of the light guide plate;
the backlight source being arranged between the light guide plate and the mold frame.

The optical film assembly comprises, in sequence from bottom to top, a diffuser plate, a lower prism plate, and an upper prism plate stacked on one another.

The accommodation holes are formed in one or multiple locations on a top surface, a lateral side surface, and a bottom surface of the mold frame.

The height-constraint components comprise capacitors and resistors.

The second flexible circuit board is arranged on a top surface and a lateral side surface of the mold frame.

The liquid crystal display panel drive circuit further comprises a plurality of non-height-constraint components having heights lower than the height-constraint components, the plurality of non-height-constraint components being arranged on the first flexible circuit board.

The present invention also provides a liquid crystal display device, which comprises: a liquid crystal display panel and a backlight module arranged on an undersurface of the liquid crystal display panel;
the liquid crystal display panel comprising a liquid crystal display panel body and a first flexible circuit board that is arranged at one side of the liquid crystal display panel body and is electrically connected with the liquid crystal display panel body;
the backlight module comprising a mold frame, a backlight source arranged in the mold frame, and a second flexible circuit board that is arranged on a top surface of the backlight source and a surface of the mold frame and is electrically connected to both the backlight source and the first flexible circuit board;
the second flexible circuit board comprising a backlight source drive circuit formed thereon;
the first flexible circuit board and the second flexible circuit board collectively comprising a liquid crystal display panel drive circuit formed thereon, the liquid crystal display panel drive circuit comprising a plurality of height-constraint components;
the plurality of height-constraint components being arranged on a surface of the second flexible circuit board that is adjacent to the mold frame, the mold frame comprising accommodation holes formed therein at locations corresponding to the height-constraint components arranged on the second flexible circuit board in order to receive and accommodate the height-constraint components therein;

wherein the backlight module further comprises a reflector plate arranged on an undersurface of the mold frame, a light guide plate arranged on a top surface of the reflector plate, and am optical film assembly arranged on a top surface of the light guide plate;
the backlight source being arranged between the light guide plate and the mold frame;

wherein the optical film assembly comprises, in sequence from bottom to top, a diffuser plate, a lower prism plate, and an upper prism plate stacked on one another;

wherein the first flexible circuit board extends from a top surface of the backlight module through a lateral side surface of the backlight module and is backward folded to be positioned on an undersurface of the backlight module; and wherein the liquid crystal display panel drive circuit further comprises a plurality of non-height-constraint components having heights lower than the height-constraint components, the plurality of non-height-constraint components being arranged on the first flexible circuit board.

The efficacy of the present invention is that the present invention provides a liquid crystal display device, which comprises a liquid crystal display panel and a backlight module arranged on an undersurface of the liquid crystal display panel; a first flexible circuit board and a second flexible circuit board are electrically connected together and height-constraint components of a liquid crystal display panel drive circuit and a backlight source drive circuit are collectively arranged on the second flexible circuit board, and a mold frame of the backlight module is provided with accommodation holes formed therein to receive and accommodate the height-constraint components thereby the thickness of the liquid crystal display device is effectively reduced and product competition power is enhanced.

BRIEF DESCRIPTION OF THE DRAWINGS

The features and technical contents of the present invention will be better understood by referring to the following detailed description and drawings the present invention. However, the drawings are provided for the purpose of reference and illustration and are not intended to limit the scope of the present invention. In the drawing.

DETAILED DESCRIPTION OF THE PREFERRED EMBODIMENTS

To further expound the technical solution adopted in the present invention and the advantages thereof, a detailed description is given to a preferred embodiment of the present invention with reference to the attached drawings.

Figure 1:
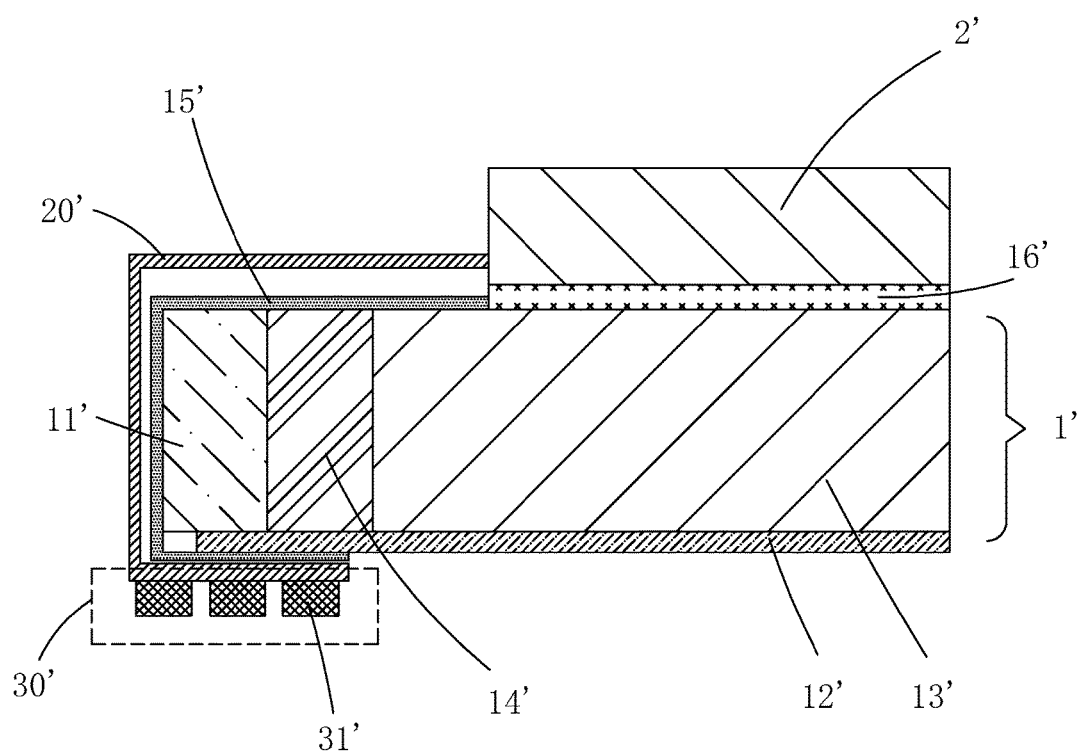
FIG. 1 is a schematic view illustrating the structure of a conventional liquid crystal display device.
Figure 2:
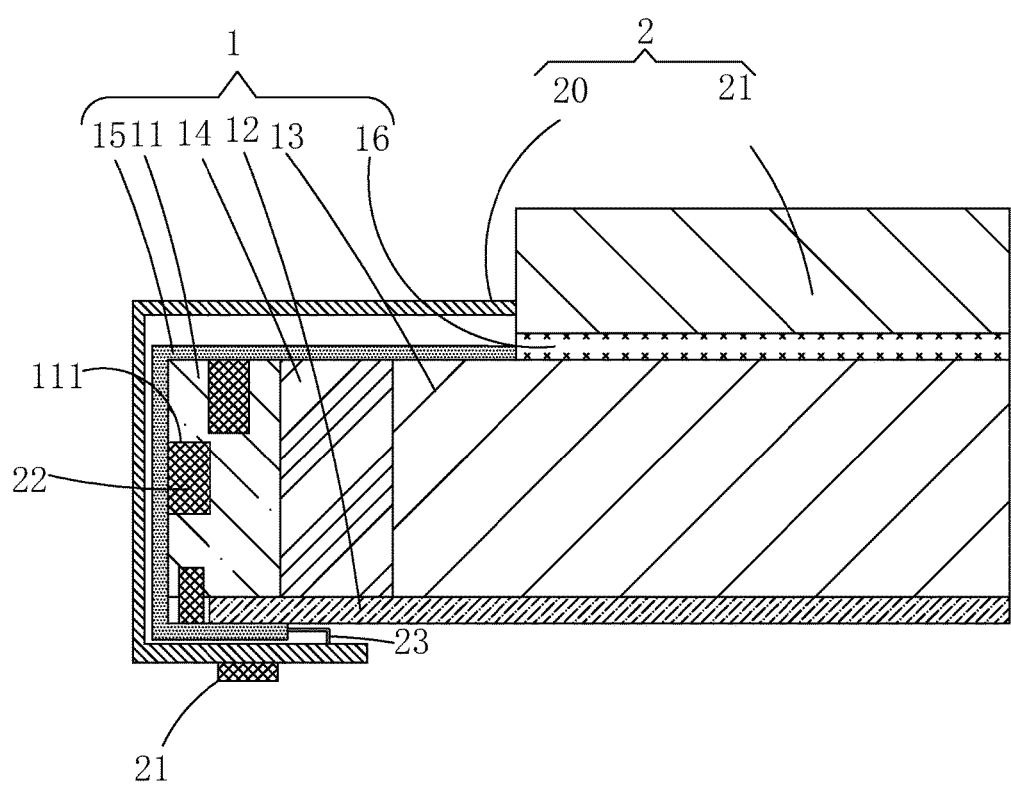
FIG. 2 is a schematic view illustrating the structure of a liquid crystal display device according to a first embodiment of the present invention.
Figure 3:
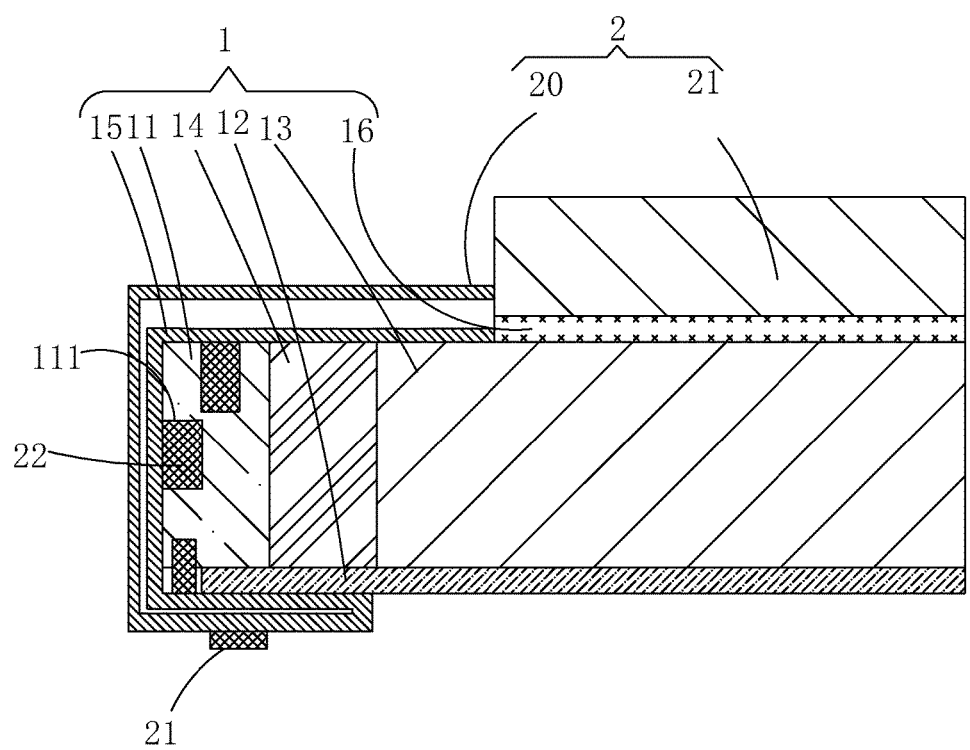
FIG. 3 is a schematic view illustrating the structure of a liquid crystal display device according to a second embodiment of the present invention.

Referring to FIG. 2 or 3, the present invention provides a liquid crystal display device, which comprises: a liquid crystal display panel 2 and a backlight module 1 arranged on an undersurface of the liquid crystal display panel 2.

The liquid crystal display panel 2 comprises: a liquid crystal display panel body 21 and a first flexible circuit board 20 that is arranged at one side of the liquid crystal display panel body 21 and is electrically connected with the liquid crystal display panel body 21.

The backlight module 1 comprises: a mold frame 11, a backlight source 14 arranged in the mold frame 11, and a second flexible circuit board 15 that is arranged on a top surface of the backlight source 14 and a surface of the mold frame 11 and is electrically connected to both the backlight source 14 and the first flexible circuit board 20.

The second flexible circuit board 15 comprises a backlight source drive circuit formed thereon.

The first flexible circuit board 20 and the second flexible circuit board 15 collectively comprise a liquid crystal display panel drive circuit formed thereon. The liquid crystal display panel drive circuit comprises a plurality of height-constraint components 22.

The plurality of height-constraint components 22 is arranged on a surface of the second flexible circuit board 15 that is adjacent to the mold frame 11 and the mold frame 11 comprises accommodation holes 111 formed therein at locations corresponding to the height-constraint components 22 arranged on the second flexible circuit board 15 in order to receive and accommodate the height-constraint components 22 therein.

Specifically, the height-constraint components 22 are components/devices that, after being mounted or installed, have height exceeding a predetermined upper limit of height, such as components/devices including capacitors and resistors that often have relatively great heights after mounting or installation. Further, the liquid crystal display panel drive circuit further comprises a plurality of non-height-constraint components 21 having heights that are lower than the height-constraint components 22. The plurality of non-height-constraint components 21 is arranged on the first flexible circuit board 20. The height-constraint components 22 and the non-height-constraint components 21 collectively form the liquid crystal display panel drive circuit.

Specifically, the liquid crystal display device further comprises: a glass cover arranged on a top surface of the liquid crystal display panel 2, an intermediate frame arranged on an undersurface of the backlight module 1, a secondary main board arranged at one side of an undersurface of the intermediate frame, a speaker arranged on the undersurface of the intermediate frame, and a rear enclosure arranged at an undersurface of the glass cover and enclosing the liquid crystal display panel, the backlight module, the drive circuits, a front bezel and the intermediate frame, the secondary main board, and the speaker.

Further, the backlight module 1 further comprises: a reflector plate 12 arranged on an undersurface of the mold frame 11, a light guide plate 13 arranged on a top surface of the reflector plate 12, and an optical film assembly 16 arranged on a top surface of the light guide plate 11. The backlight source 14 is arranged between the light guide plate 13 and the mold frame 11. The optical film assembly 16 comprises, in sequence from bottom to top, a diffuser plate, a lower prism plate, and an upper prism plate stacked on one another.

Specifically, the locations of the accommodation holes 111 can be selected according to requirements. Preferably, the accommodation holes 111 are formed in one or multiple locations on a top face, a side face, and/or a bottom face of the mold frame 11.

Further, the first flexible circuit board 20 and the second flexible circuit board 15 are electrically connected together so that the liquid crystal display panel drive circuit is divided into two portions respectively arranged on the first flexible circuit board 20 and the second flexible circuit board 15 and is capable of normally driving the liquid crystal display panel. Optionally, referring to FIG. 2, in a first embodiment of the present invention, the first flexible circuit board 20 and the second flexible circuit board 15 are two separate and independent flexible circuit board and the first flexible circuit board 20 and the second flexible circuit board 15 are electrically connected to each other by means of a connector 23. Optionally, referring to FIG. 3, in a second embodiment of the present invention, the first flexible circuit board 20 and the second flexible circuit board 15 are two different portions of a single unitary flexible circuit board.

It is noted that the liquid crystal display device is structured so that the height-constraint components 22 of the liquid crystal display panel drive circuit and the backlight source drive circuit are collectively arranged on the second flexible circuit board 15 and the non-height-constraint components of the liquid crystal display panel drive circuit 21 are arranged on the first flexible circuit board 20; the mold frame 11 of the backlight module 1 are provided with the accommodation holes 111 formed therein to allow the height-constraint components 22 to be received and accommodated in the accommodation holes 111 of the mold frame 11 so that when the first flexible circuit board 20 is backward folded to be positioned on the undersurface of the backlight module 1, the location of a highest point of the portion of the first flexible circuit board 20 on the undersurface of the backlight module 1 can be lowered. Thus, compared to the prior art arrangements where the height-constraint components are arranged on the portion of the first flexible circuit board 20 that is on the undersurface of the backlight module 1, the present invention may lower down the location of the highest point of the first flexible circuit board 20 thereby reducing the thickness of the liquid crystal display device and improving product competition power.

Specifically, the first flexible circuit board 20 extends from the top surface of the backlight module 1 through a lateral side surface of the backlight module 1 and is backward folded to be positioned on the undersurface of the backlight module 1. The second flexible circuit board 15 may, alternatively, be arranged on the top surface and a lateral side surface of the mold frame 11 only so that the undersurface of the backlight module 1 receives only the first flexible circuit board 20 positioned thereon, whereby the location of the highest point of the first flexible circuit board 20 can be further lowered down and the thickness of the liquid crystal display device can be further reduced.

In summary, the present invention provides a liquid crystal display device, which comprises a liquid crystal display panel and a backlight module arranged on an undersurface of the liquid crystal display panel; a first flexible circuit board and a second flexible circuit board are electrically connected together and height-constraint components of a liquid crystal display panel drive circuit and a backlight source drive circuit are collectively arranged on the second flexible circuit board, and a mold frame of the backlight module is provided with accommodation holes formed therein to receive and accommodate the height-constraint components thereby the thickness of the liquid crystal display device is effectively reduced and product competition power is enhanced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising: a liquid crystal display panel and a backlight module arranged on an undersurface of the liquid crystal display panel;

the liquid crystal display panel comprising a liquid crystal display panel body and a first flexible circuit board that is arranged at one side of the liquid crystal display panel body and is electrically connected with the liquid crystal display panel body;

the backlight module comprising a mold frame, a backlight source arranged in the mold frame, and a second flexible circuit board that is arranged on a top surface of the backlight source and a surface of the mold frame and is electrically connected to both the backlight source and the first flexible circuit board;

the second flexible circuit board comprising a backlight source drive circuit formed thereon;

the first flexible circuit board and the second flexible circuit board collectively comprising a liquid crystal display panel drive circuit formed thereon, the liquid crystal display panel drive circuit comprising a plurality of height-constraint components;

the plurality of height-constraint components being arranged on an inside surface of the second flexible circuit board that is adjacent to and faces toward the mold frame, the mold frame comprising accommodation holes formed therein at locations corresponding to the height-constraint components arranged on the second flexible circuit board in order to receive and accommodate the height-constraint components therein;

wherein the first flexible circuit board extends along a top surface of the backlight module and a lateral side surface of the backlight module to be backward folded to position on an undersurface of the backlight module and the second flexible circuit board is arranged on a top surface and a lateral side surface of the mold frame of the backlight module and is located between the first flexible circuit board and the backlight module;

wherein the second flexible circuit board has an outside surface facing away from the mold frame and the first flexible circuit board has an internal surface that faces toward and is adjacent to the outside surface of the second flexible circuit board and an external surface that is opposite to the internal surface and faces away from the second flexible circuit board, a plurality of non-height-constraint components having height lower than the height-constraint components and being arranged on the external surface of the first flexible circuit board so as to be opposite to and projecting from the first flexible circuit board in a direction away from the second flexible circuit board.

2. The liquid crystal display device as claimed in claim 1, wherein the first flexible circuit board and the second flexible circuit board are two separate flexible circuit boards and the first flexible circuit board and the second flexible circuit board are electrically connected to each other through a connector.

3. The liquid crystal display device as claimed in claim 1, wherein the first flexible circuit board and the second flexible circuit board are two separate portions of a unitary flexible circuit board.

4. The liquid crystal display device as claimed in claim 1, wherein the backlight module further comprises a reflector plate arranged on an undersurface of the mold frame, a light guide plate arranged on a top surface of the reflector plate, and am optical film assembly arranged on a top surface of the light guide plate;

the backlight source being arranged between the light guide plate and the mold frame.

5. The liquid crystal display device as claimed in claim 4, wherein the optical film assembly comprises, in sequence from bottom to top, a diffuser plate, a lower prism plate, and an upper prism plate stacked on one another.

6. The liquid crystal display device as claimed in claim 1, wherein the accommodation holes are formed in one or multiple locations on a top surface, a lateral side surface, and a bottom surface of the mold frame.

7. The liquid crystal display device as claimed in claim 1, wherein the height-constraint components comprise capacitors and resistors.

8. The liquid crystal display device, comprising: a liquid crystal display panel and a backlight module arranged on an undersurface of the liquid crystal display panel;

the liquid crystal display panel comprising a liquid crystal display panel body and a first flexible circuit board that is arranged at one side of the liquid crystal display panel body and is electrically connected with the liquid crystal display panel body;

the backlight module comprising a mold frame, a backlight source arranged in the mold frame, and a second flexible circuit board that is arranged on a top surface of the backlight source and a surface of the mold frame and is electrically connected to both the backlight source and the first flexible circuit board;

the second flexible circuit board comprising a backlight source drive circuit formed thereon;

the first flexible circuit board and the second flexible circuit board collectively comprising a liquid crystal display panel drive circuit formed thereon, the liquid crystal display panel drive circuit comprising a plurality of height-constraint components;

the plurality of height-constraint components being arranged on an inside surface of the second flexible circuit board that is adjacent to and faces toward the mold frame, the mold frame comprising accommodation holes formed therein at locations corresponding to the height-constraint components arranged on the second flexible circuit board in order to receive and accommodate the height-constraint components therein;

wherein the backlight module further comprises a reflector plate arranged on an undersurface of the mold frame, a light guide plate arranged on a top surface of the reflector plate, and am optical film assembly arranged on a top surface of the light guide plate;

the backlight source being arranged between the light guide plate and the mold frame;

wherein the optical film assembly comprises, in sequence from bottom to top, a diffuser plate, a lower prism plate, and an upper prism plate stacked on one another;

wherein the first flexible circuit board extends along a top surface of the backlight module and a lateral side surface of the backlight module to be backward folded to position on an undersurface of the backlight module and the second flexible circuit board is arranged on a top surface and a lateral side surface of the mold frame of the backlight module and is located between the first flexible circuit board and the backlight module; and wherein the second flexible circuit board has an outside surface facing away from the mold frame and the first flexible circuit board has an internal surface that faces toward and is adjacent to the outside surface of the second flexible circuit board and an external surface that is opposite to the internal surface and faces away from the second flexible circuit board, a plurality of non-height-constraint components having heights lower than the height-constraint components and being arranged on the external surface of the first flexible circuit board so as to be opposite to and projecting from the first flexible circuit board in a direction away from the second flexible circuit board.

9. The liquid crystal display device as claimed in claim 8, wherein the first flexible circuit board and the second flexible circuit board are two separate flexible circuit boards and the first flexible circuit board and the second flexible circuit board are electrically connected to each other through a connector.

10. The liquid crystal display device as claimed in claim 8, wherein the first flexible circuit board and the second flexible circuit board are two separate portions of a unitary flexible circuit board.

11. The liquid crystal display device as claimed in claim 8, wherein the accommodation holes are formed in one or multiple locations on a top surface, a lateral side surface, and a bottom surface of the mold frame.

12. The liquid crystal display device as claimed in claim 8, wherein the height-constraint components comprise capacitors and resistors.

\* \* \* \* \*